Oct. 9, 1962   G. P. RANSOM ETAL   3,057,545
REFRIGERATING APPARATUS
Filed April 11, 1960   6 Sheets-Sheet 1

INVENTORS
George P. Ransom
William K. Steinhagen
Donald C. Unger
BY
Edwin S. Dybvig
Their Attorney Oct. 9, 1962    G. P. RANSOM ETAL    3,057,545
REFRIGERATING APPARATUS
Filed April 11, 1960                    6 Sheets-Sheet 2

INVENTORS
George P. Ransom
William K. Steinhagen
BY Donald C. Unger

Edwin S. Dybvig
Their Attorney

Oct. 9, 1962 G. P. RANSOM ETAL 3,057,545
REFRIGERATING APPARATUS
Filed April 11, 1960 6 Sheets-Sheet 3

INVENTORS
George P. Ransom
William K. Steinhagen
Donald C. Unger
BY Edwin S. Ryberg
Their Attorney Oct. 9, 1962

G. P. RANSOM ETAL 3,057,545

REFRIGERATING APPARATUS

Filed April 11, 1960

INVENTORS
George P. Ransom
William K. Steinhagen
Donald C. Unger
BY Edwin S. Dyking
Their Attorney Oct. 9, 1962 G. P. RANSOM ETAL 3,057,545
REFRIGERATING APPARATUS Filed April 11, 1960 6 Sheets-Sheet 5

INVENTORS
George P. Ransom
William K. Steinhagen
Donald C. Unger
BY Edwin S. Dyking
Their Attorney Oct. 9, 1962   G. P. RANSOM ETAL   3,057,545
REFRIGERATING APPARATUS
Filed April 11, 1960   6 Sheets-Sheet 6
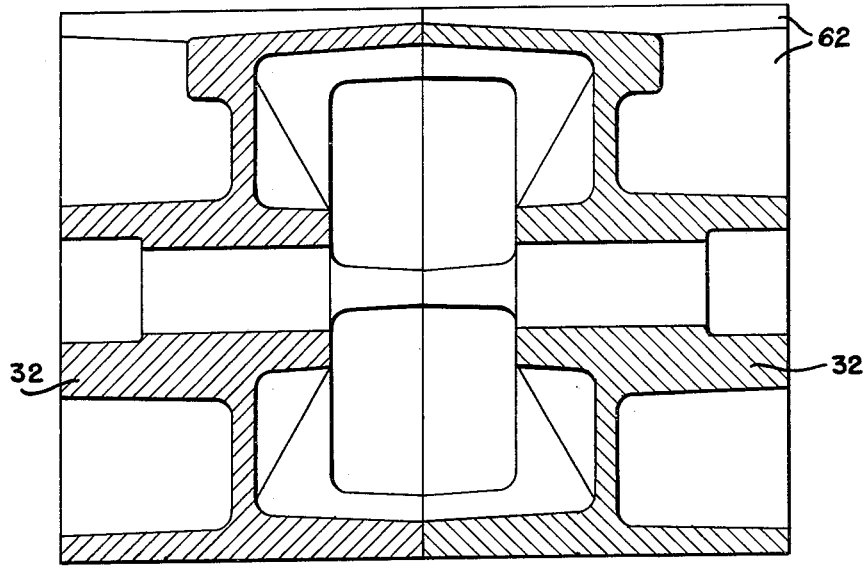
Fig. 15
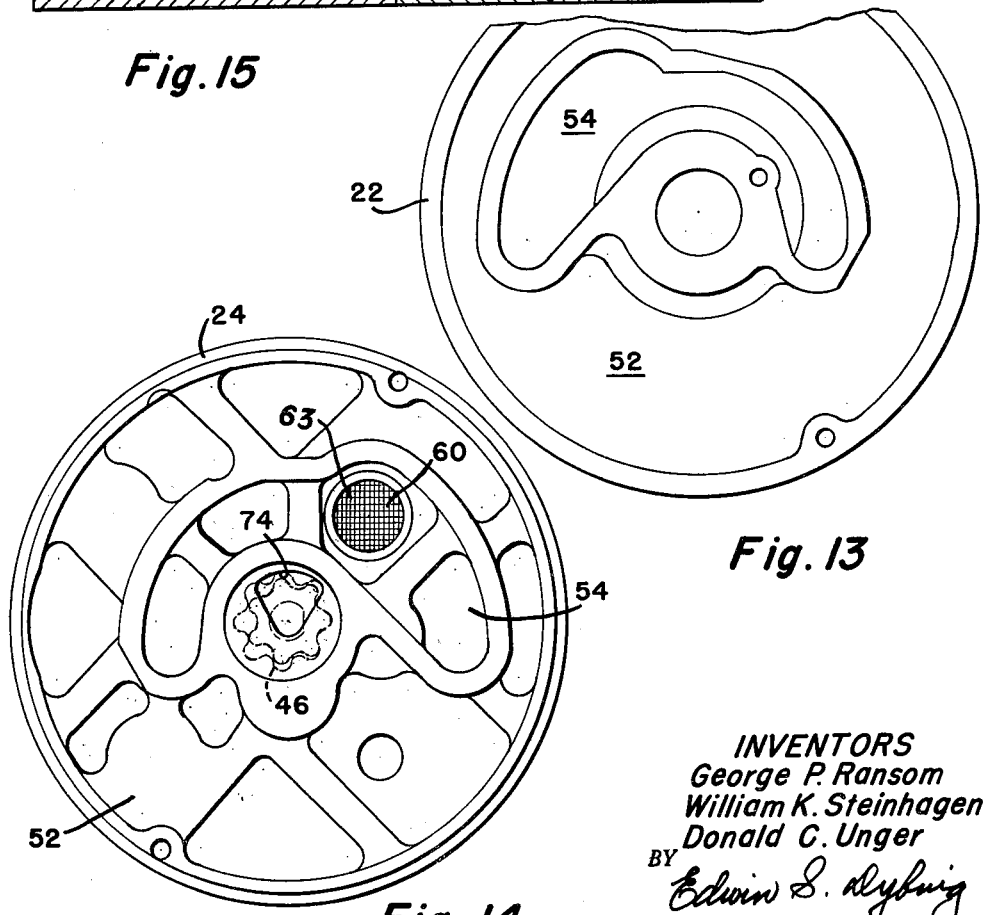
Fig. 13
Fig. 14
INVENTORS
George P. Ransom
William K. Steinhagen
Donald C. Unger
BY Edwin S. Dybvig
Their Attorney

United States Patent Office 3,057,545
Patented Oct. 9, 1962

3,057,545
REFRIGERATING APPARATUS
George P. Ransom, Berkley, William K. Steinhagen, Royal Oak, and Donald C. Unger, Grosse Pointe Park, Mich., assignors to General Motors Corporation, Detroit, Mich., a corporation of Delaware
Filed Apr. 11, 1960, Ser. No. 21,252
1 Claim. (Cl. 230—186)

This invention relates to refrigerating apparatus and more particularly to a swash plate compressor for use in refrigerating systems and the like.

It is an object of this invention to provide a small compressor suitable for use in automobile air conditioning systems and the like wherein three double-acting pistons are reciprocated by means of a swash plate.

It is another object of this invention to provide a compact multiple cylinder compressor having a minimum number of parts.

Another object of this invention is to provide a compressor wherein one or more double-acting pistons are arranged to be operated by means of a swash plate which has its periphery arranged to extend into a notch formed in the side of each piston.

A further object of this invention is to provide an arrangement whereby the friction between the swash plate and the pistons is maintained at a minimum.

Still another object of this invention is to provide a multiple cylinder compressor which lends itself to mass production.

Further objects and advantages of the present invention will be apparent from the following description, reference being had to the accompanying drawings wherein a preferred embodiment of the present invention is clearly shown.

In the drawings:

FIGURE 13 is a view of the inside of the one cylinder head.

FIGURE 14 is a view of the inside of the other cylinder head.

FIGURE 15 is a sectional view of the cylinder blocks taken on line 15—15 on FIGURE 11.

Figure 1:
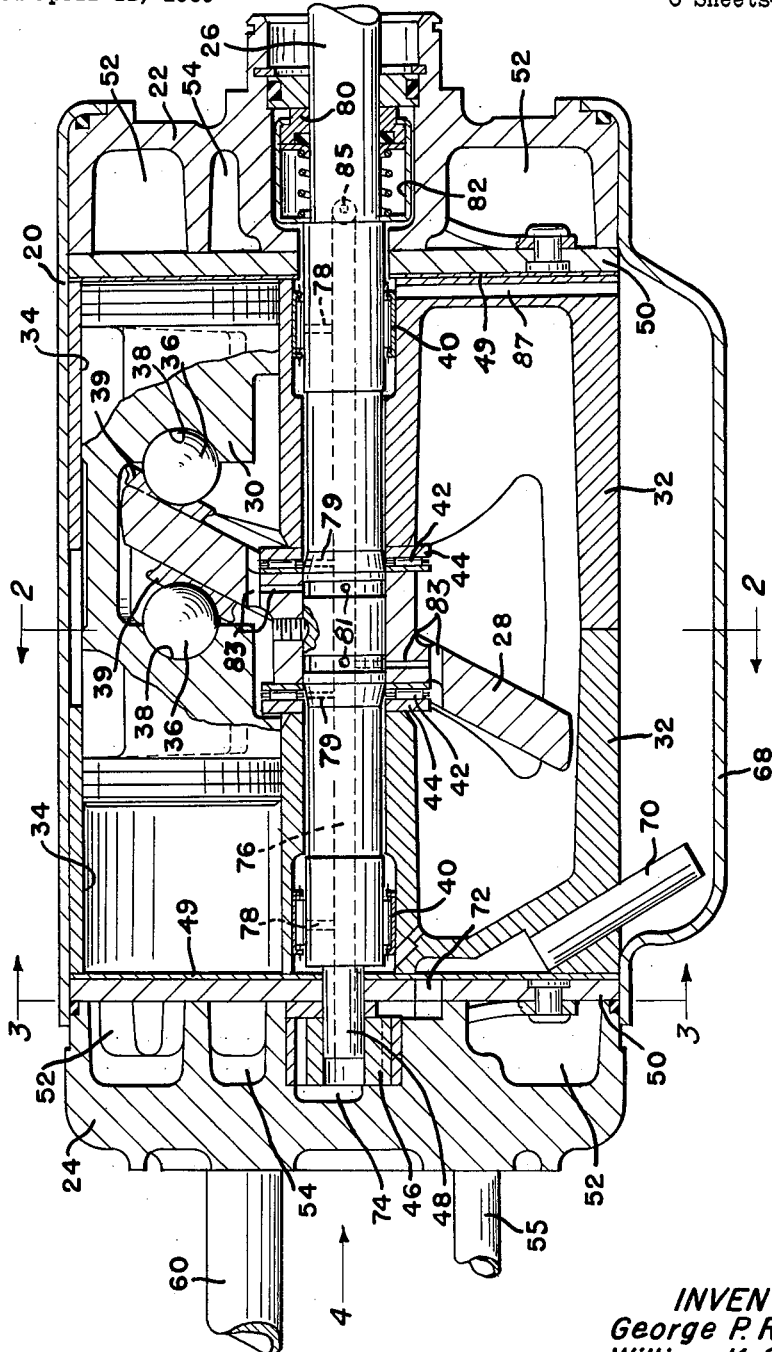
FIGURE 1 is a vertical sectional view of the compressor.
Figure 2:
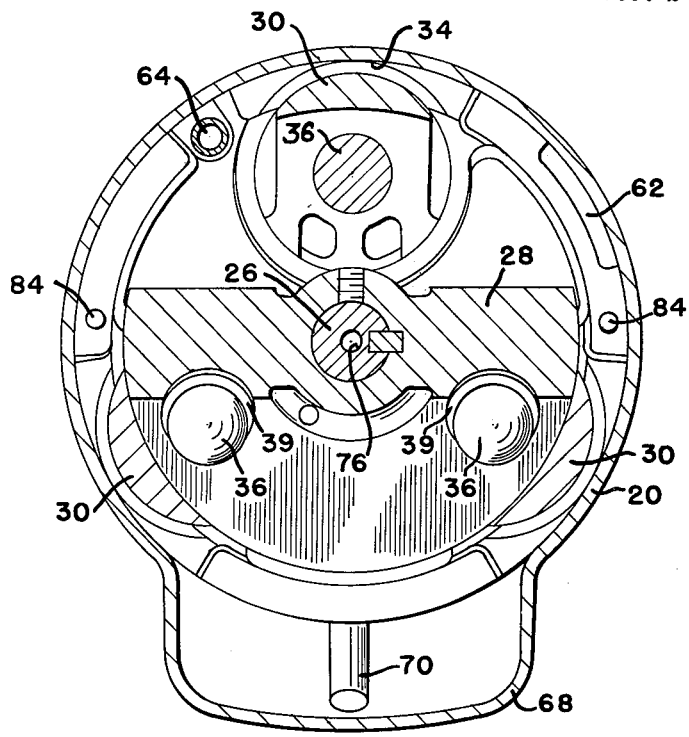
FIGURE 2 is a sectional view taken substantially on line 2—2 of FIGURE 1.

Referring now to the drawings wherein a preferred embodiment of the invention has been shown, reference numeral 20 designates a stamped sheet metal outer housing element which is substantially cylindrical in shape and serves to support a pair of cylinder heads 22 and 24 which close the opposite ends of the housing 20, as shown. Reference numeral 26 designates the compressor drive shaft which has keyed to it a swash plate 28. The swash plate 28 serves to actuate three double-acting die cast pistons 30 which are arranged to reciprocate in a direction parallel to the axis of the shaft 26.

A pair of cylinder blocks 32 are provided, as shown, and these cylinder blocks are supported within the outer casing 20 and are each provided with cylinder bores 34 in which the pistons 30 reciprocate in response to rotation of the shaft 26. Each of the pistons 30 has a central part of its one side cut away as shown so as to straddle the outer edge of the swash plate 28. Rotation of the swash plate 28 causes reciprocation of the pistons 30. In order to minimize the friction between the swash plate and the pistons, there is provided a series of ball bearings 36 which are disposed between ball sockets 38 formed in the piston elements 30 and thrust bearing shoes 39 which are arranged to slide on the swash plate 28 as shown in FIGURE 1. While the compressor shown in the drawing utilizes shoes 39 which run against the swash plate, these could be eliminated and the balls could bear directly against the plate. The sockets 38 can be machined or they may be cast in place in a suitable die casting process by using ball shaped elements identical in size to the balls 36. In this latter manner it is possible to obtain excellent conformity in the sockets 38. Adjustment for piston end play over the swash plate is obtained by means of selective assembly of tabulated shoe thicknesses so that when the parts are properly selected and assembled, there will be controlled end play.

By virtue of the bearing construction shown herein, the piston pumping loads are taken both by two radial needle bearings 40 and two needle thrust bearings 42. Shaft end play is adjusted by means of selecting washers 44 of the proper thickness.

A separate valve plate 50 and intake reed 49 is provided adjacent each end of the cylinder blocks 32, as shown. Each valve plate is provided with the usual sets of inlet and outlet ports 51 and 53 which provide communication between the pumping chambers and the discharge chambers 52 and suction chambers 54 provided in the cylinder heads 22 and 24.

Figure 3:
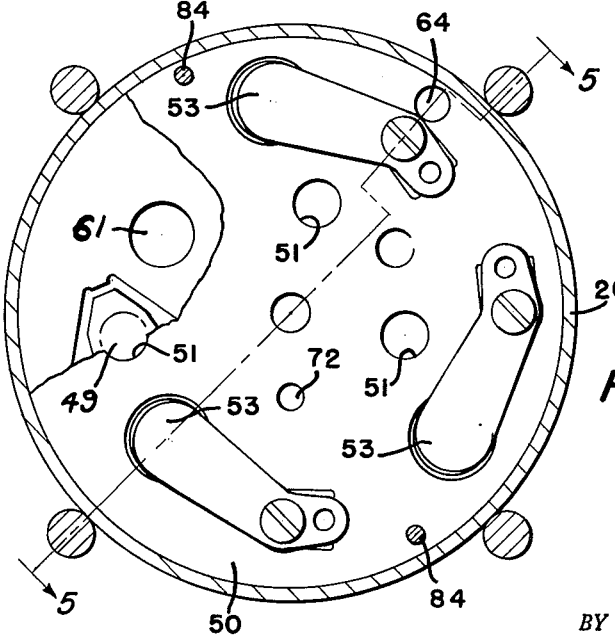
FIGURE 3 is a sectional view taken substantially on line 3—3 of FIGURE 1 with parts broken away.
Figure 4:
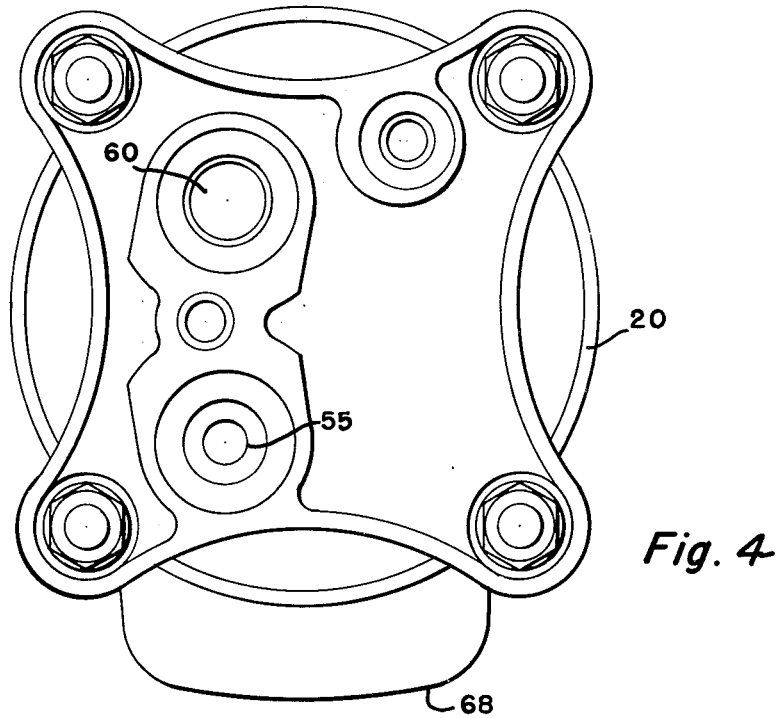
FIGURE 4 is an end elevational view.

The gas to be compressed is admitted to the suction chamber 54 formed in the cylinder head 24 through an inlet line 60, and inlet screen 63. The valve plate 50 is arranged in abutting relationship to the cylinder head 24 and is provided with a passage 61 (FIGURE 3) which communicates with cutaway portions in the cylinder blocks 32 including the longitudinally extending cutaway portion 62 so as to convey a portion of the suction gas from the suction chamber in the cylinder head 24 to a corresponding suction chamber 54 in the cylinder head 22.

Figure 5:
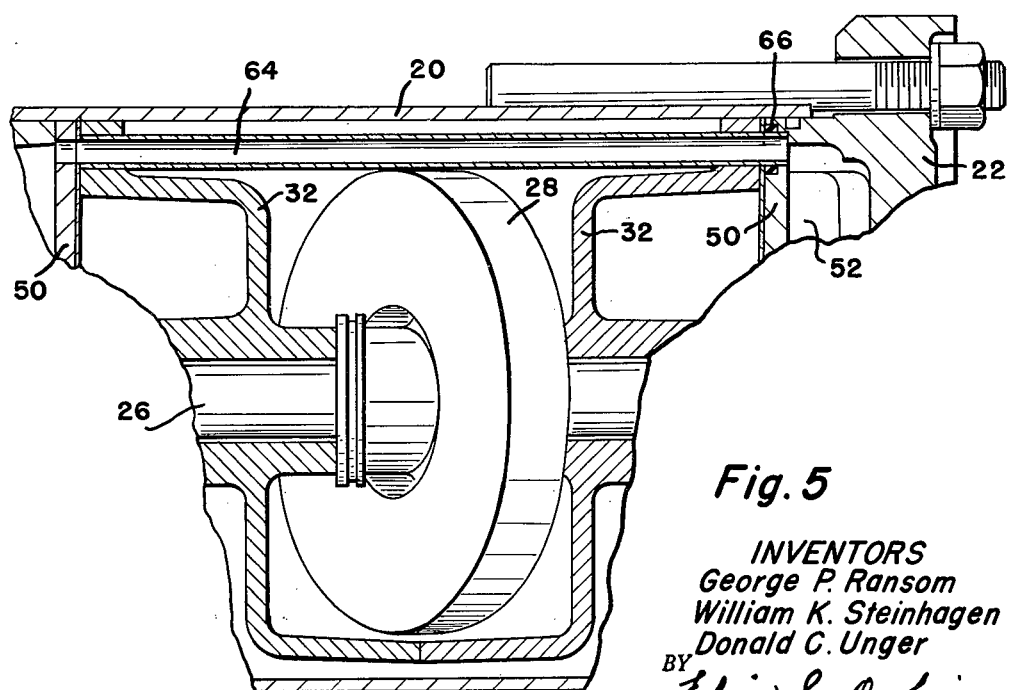
FIGURE 5 is a fragmentary sectional view taken substantially on line 5—5 of FIGURE 3.
Figure 10:
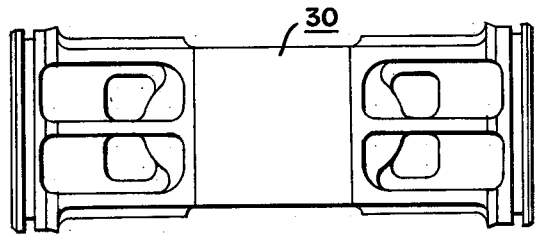
FIGURE 10 is a plan view of the piston.
Figure 7:
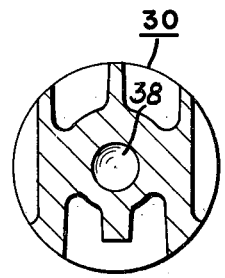
FIGURE 7 is a sectional view taken on line 7—7 of FIGURE 6.
Figure 6:
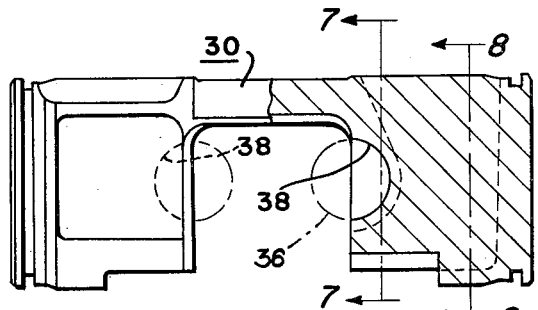
FIGURE 6 is an elevational view of one of the pistons with parts broken away.
Figure 8:
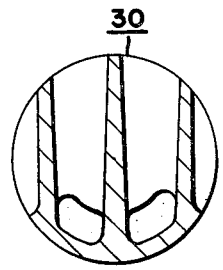
FIGURE 8 is a sectional view taken on line 8—8 of FIGURE 6.
Figure 9:
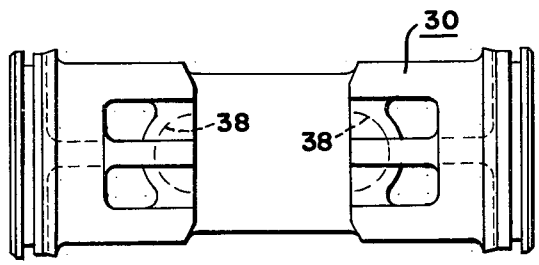
FIGURE 9 is a bottom view of the piston shown in FIGURE 6.
Figure 12:
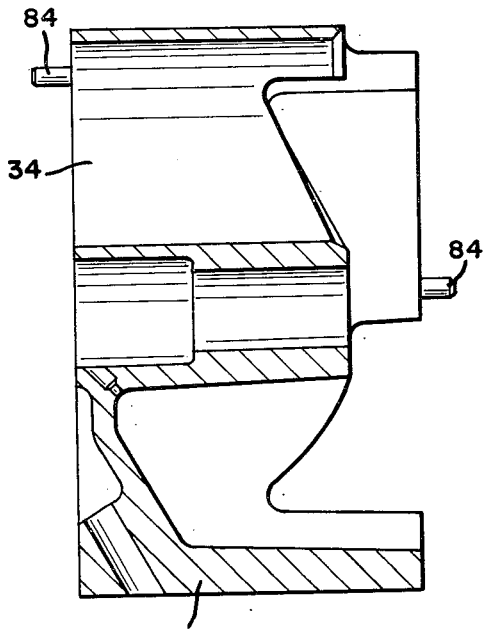
FIGURE 12 is a sectional view taken on line 12—12 of FIGURE 11.
Figure 11:
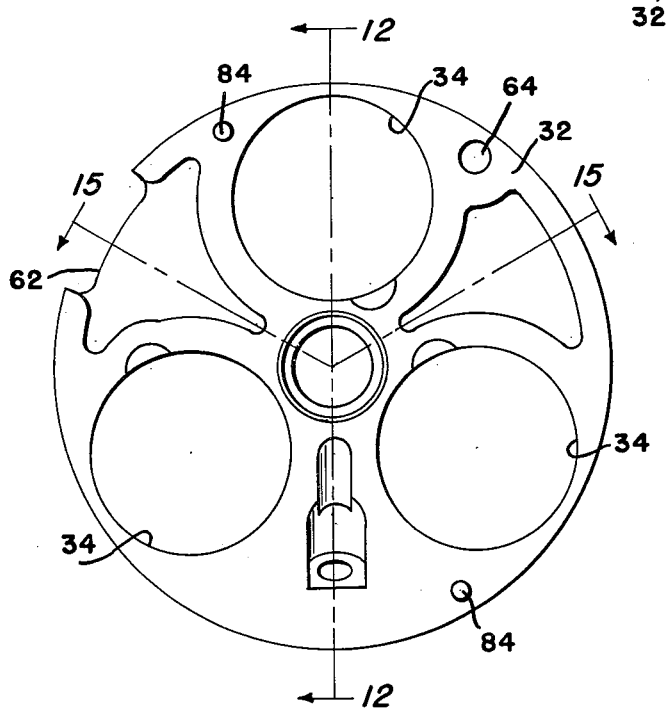
FIGURE 11 is an end elevational view of the cylinder block.

Compressed gas is discharged into both of the cylinder heads and therefore it is essential to provide means for connecting these discharge passages and, as best shown in FIGURE 5 of the drawings, these passages are connected by means of the cross-over tube 64. This tube is pressed into the front cylinder and may be sealed by means of an O-ring 66 carried by the valve plate 50 or other suitable sealing means so as to prevent discharge gas from leaking back to the crankcase. The compressed refrigerant leaves the compressor through the outlet line 55. The bottom wall of the casing 20 is provided with a bulge portion 68 which forms an oil sump located remotely from the lower edge of the swash plate 28. A gear type oil pump 46 driven by a D-shaped quill 48 which is an extension of the shaft 26 serves to withdraw oil from the sump 68 through an oil pick-up tube 70 which communicates with aligned passages 72 in the various compressor components, which latter passage conveys the oil to the inlet side of the oil pump 46. The oil leaving the pump 46 is forced into a cavity 74 from whence the oil flows through the oil fed passage 76 from whence oil is fed to the various bearing surfaces through suitable radially extending oil fed passages, such as the passages 78, 79 and 81. Thus it will be seen that oil is fed directly to the needle thrust bearings 42 through the passages 79. Additional lubricant is fed through the passages 81 which communicate with oil feed passages 83 in the swash plate 28 so as to provide lubricant for the shoes 39 as well as the balls 38.

Lubricant is fed to the shaft seal cavity 82 through the radial oil feed passage 85. Any adequate amount of oil must be circulated through the cavity 82 to provide the necessary cooling for the shaft seal. Oil is free to flow from the cavity 82 along the outer surface of the shaft 26 into the oil return passage 87 leading to the oil sump 68.

A shaft seal assembly 80 supported within the shaft seal cavity 82 formed in the cylinder head 22 serves to prevent the escape of refrigerant and lubricant at the point where the drive shaft 26 enters the compressor housing.

Positioning dowels such as the dowels 84 serve to maintain the proper relationship between the cylinder heads and the cylinder blocks and also between the mating surfaces of the cylinder blocks.

While the embodiment of the present invention as herein disclosed, constitutes a preferred form, it is to be understood that other forms might be adopted.

What is claimed is as follows:

In a compressor, a cylindrical casing element, a pair of cylinder blocks disposed intermediate the ends of said cylindrical casing element and each having its outer periphery arranged in engagement with the inner surface of said cylindrical casing, cylinder heads disposed within opposite ends of said cylindrical casing element, one only of said cylinder heads having an inlet line and an outlet line, the other of said cylinder heads having a shaft seal cavity therein, valve plate means interposed between said cylinder heads and said cylinder blocks and having inlet and outlet ports therein, said cylinder heads having inlet and outlet chambers adjacent said inlet and outlet ports respectively, the inlet and outlet chambers in said one only of said cylinder heads being in communication with said inlet line and said outlet line respectively, a compressor drive shaft having its ends journaled in said cylinder blocks, one of said shaft ends being in said shaft seal cavity, said cylinder blocks having first passage means therein for connecting said outlet chambers and forming with said casing element second passage means therein for connecting said inlet chambers, a cross-over tube arranged in said first passage means for conveying compressed gas between said outlet chambers, O-ring means carried by said valve plate means for engaging the outer periphery of said cross-over tube, said cylinder blocks having a plurality of aligned pumping chambers spaced radially outwardly from the central axis of said shaft, piston means arranged to reciprocate within said pumping chambers, a swash plate disposed between said cylinder blocks and secured to said shaft so as to rotate therewith, means whereby rotation of said swash plate imparts reciprocation to said piston means, end thrust bearing means sandwiched between said cylinder blocks and arranged to engage surfaces on said swash plate so as to restrict endwise movement of said shaft, said one only of said cylinder heads having a lubricant pump cavity therein, said cylindrical casing having an outwardly bulged portion adjacent its lower side serving as a lubricant sump, bearing means for rotatably supporting said shaft, lubricant pump means driven by said shaft and disposed wholly within said lubricant pump cavity, means for conveying lubricant from said sump to the inlet of said pump means, said shaft having a longitudinally extending passage formed therein for supplying lubricant from the outlet of said pump means to said shaft seal cavity for cooling said one of said shaft ends, said passage having outlet means for distributing lubricant to said bearing means.

References Cited in the file of this patent

UNITED STATES PATENTS

| | | |
|---|---|---|
| 1,229,009 | Allison | June 5, 1917 |
| 2,077,986 | Cassani | Apr. 20, 1937 |
| 2,386,675 | Ford | Oct. 9, 1945 |
| 2,491,011 | Michell | Dec. 13, 1949 |
| 2,798,663 | Chayne, et al. | July 9, 1957 |
| 2,864,551 | Heidorn | Dec. 16, 1958 |
| 2,868,443 | Dolza | Jan. 13, 1959 |

FOREIGN PATENTS

| | | |
|---|---|---|
| 562,232 | France | Aug. 29, 1923 |
| 610,428 | Great Britain | Oct. 15, 1948 |
| 836,476 | France | Feb. 4, 1943 |
| 1,058,195 | France | Mar. 15, 1954 |